UNITED STATES PATENT OFFICE.

RASIK LAL DATTA, OF CALCUTTA, INDIA.

PROCESS OF RECOVERY OF SULFUR.

1,313,370. Specification of Letters Patent. Patented Aug. 19, 1919.

No Drawing. Application filed September 25, 1918. Serial No. 255,726.

*To all whom it may concern:*

Be it known that I, RASIK LAL DATTA, a subject of British India, residing at Calcutta, India, have invented certain new and useful Improvements in Processes of Recovery of Sulfur, of which the following is a specification.

The present invention relates to a process for the production of sulfur from sulfureted hydrogen obtained as a by-product in many manufacturing processes particularly in the treatment of Leblanc waste for the recovery of sulfur.

The process consists in the oxidation of sulfureted hydrogen either pure or mixed with any other dilutent gases by means of oxygen of the air under the catalytic influence of nitrous gases for the production of free sulfur together with small quantities of sulfuric acid.

Prior to my invention, the oxidation of sulfureted hydrogen by means of air through the catalytic influence of nitrous gases was never before known or used in practice.

To carry out my invention to practice I proceed as follows:

In a chamber preferably made of lead, I insert through separate inlets, a current of sulfureted hydrogen, a current of air and a current of nitrous gases, there being an outlet for the escape of the gaseous mixture after the reaction is finished in the chamber. As soon as nitrous gases come in contact with sulfureted hydrogen, a quantitative liberation of sulfur takes place, the nitrous gases being reduced to nitric oxid.

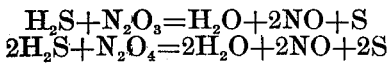

As air is present in the gaseous mixture, the liberated nitric oxid is immediately transformed into nitrous gases which again reacts upon further quantities of sulfureted hydrogen with the separation of sulfur. In this way, the same quantity of nitrous gases is able to oxidize an indefinite amount of sulfureted hydrogen until the nitrous gases have become too much dilute or are swept out of the chamber by the exit gases. As the reaction is very sensitive and takes place satisfactorily at very great dilutions, it has been found that a very small quantity of nitrous gases usually one-hundredth part of the gaseous mixture brings about the reaction. This reaction takes place at the ordinary temperature, no outside heat being necessary. On the other hand, the reaction is accompanied by a great evolution of heat, sulfureted hydrogen being highly endothermic. To prevent the heat from affecting the reaction and producing much sulfuric acid the chamber has to be cooled by suitable cooling arrangements. To enable the reaction to proceed satisfactorily, for every volume of sulfureted hydrogen three volumes of air have to be used, the proportion of nitrous gases being about one-hundredth of the gaseous mixture as already indicated. The escaping gases from the chamber contain all the nitrous gases in a highly dilute state. To recoever these nitrous gases, the exit gases are passed through a tower filled with broken earthenware or coke filling materials in which strong sulfuric acid is allowed to trickle down where all the nitrous gases are retained with the formation of nitrosylsulfuric acid. The nitrous gases may be regenerated from this nitrosylsulfuric acid by heating or treating with steam and used again for fresh reactions in the chamber. The nitrous gases which is usually a mixture of nitrogen trioxid, $N_2O_3$, and nitrogen tetroxid, $N_2O_4$, obtained from any sources whatever may be used for the reaction. Hence, it is found that the oxidation of sulfureted hydrogen for the production of sulfur is effected quantitatively by means of oxygen of the air, the same quantity of nitrous gases being available for the oxidation of an indefinite quantity of sulfureted hydrogen allowance being made for mechanical losses.

It has to be mentioned that besides the formation of sulfur a small quantity is oxidized further with the formation of sulfuric acid and this is especially the case if proper care be not taken to cool the chamber or if larger proportions of nitrous gases are used.

I claim:

1. As a new process of manufacture, the oxidation of sulfureted hydrogen in a gaseous state whether as such or mixed with other gases by means of nitrous gases for the production of sulfur substantially as described.

2. As a new process of manufacture, the oxidation of sulfureted hydrogen in a gaseous state whether as such or mixed with other gases by means of air under the catalytic influence of nitrous gases for the production of sulfur substantially as described.

In testimony whereof I affix my signature in presence of two witnesses.

RASIK LAL DATTA.

Witnesses:
CHAS. M. HAYWOOD,
E. L. ELLIS.